Dec. 31, 1957  R. E. WEBER ET AL  2,818,541
APPARATUS RESPONSIVE TO CHANGES IN FREQUENCY
Filed Aug. 15, 1955
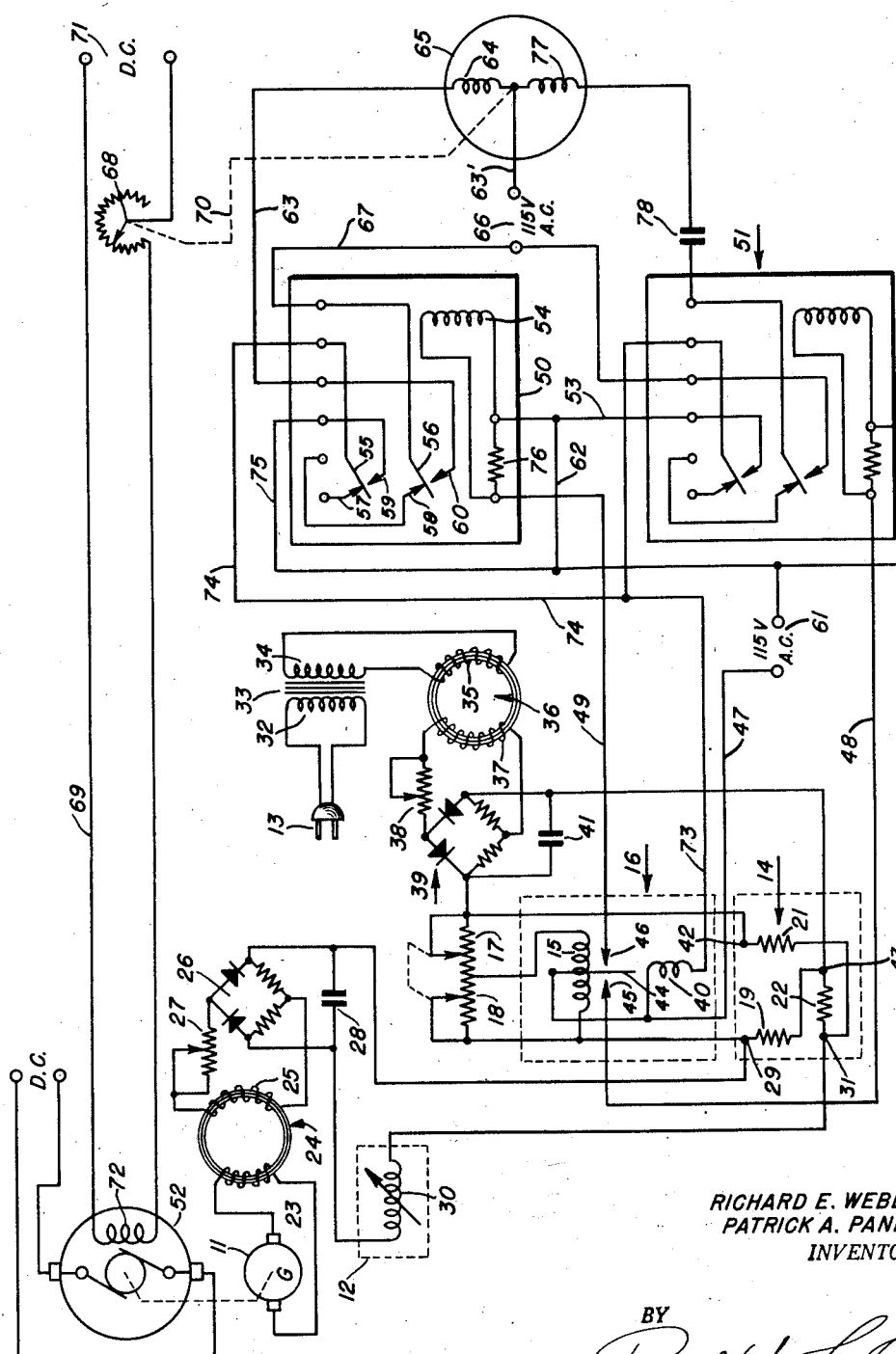
RICHARD E. WEBER and
PATRICK A. PANFILE
INVENTORS
BY
Rudolph J. Jewick
ATTORNEY

United States Patent Office 2,818,541
Patented Dec. 31, 1957

2,818,541

APPARATUS RESPONSIVE TO CHANGES IN FREQUENCY

Richard E. Weber, East Brunswick, and Patrick A. Panfile, Bayonne, N. J., assignors to Weston Electrical Instrument Corporation, Newark, N. J., a corporation of New Jersey Application August 15, 1955, Serial No. 528,279

15 Claims. (Cl. 318—318)

This invention relates to a novel system sensitive to frequency changes and having a high degree of accuracy and reliability and more particularly to an electrical network adapted for initiating a control function to maintain a variable condition at a preselected normal value.

While our sensing system is adaptable for use in any arrangement wherein a varying condition can be related to a corresponding change in frequency, the system will be described with specific reference to an arrangement for controlling the speed of a rotatable member such as a motor. The system basically is a differential electrical network employing a sensitive relay for initiating the control function and utilizing an adjustable current for reference. Such system is made frequency responsive by utilizing saturable core transformers to provide a substantially linear relationship between output current and input frequency, thereby eliminating errors due to line voltage variations or differences in the output voltages of various alternating current sources. Line frequency variations are negligible as they normally are within a range of −0.1% and the change in frequency necessary to operate the sensitive relay is set to a minimum of −0.33%.

When used as a motor speed control, all components of the apparatus are housed within a single case with the exception of the tachometer generator that is mechanically coupled to the motor shaft, the electrical instrument for indicating the motor speed and the actual apparatus for adjusting the current supplied to the motor field. A tachometer indicator is provided so that the operator will have a continuous indication of speed. A sensitive relay is employed as the controlling element of the apparatus, such relay being provided with dual magnetic contacts which positively close either of two independent circuits, one on increasing speed and the other on decreasing speed. An electrically-operated reset is provided in order to make the over-all apparatus completely automatic.

An object of this invention is the provision of an electrical system responsive to frequency variations of a source and comprising a four-arm differential bridge having two sets of input terminals and a zero mutual transfer impedance between the sets of input terminals, an electromagnetic device having an operating coil forming one arm of said bridge, a saturable core transformer having a primary winding energized by the said source and a secondary winding connected through a rectifier to one set of said bridge input terminals, and a source of direct current of predetermined magnitude connected to the other set of said bridge input terminals.

An object of this invention is the provision of an electrical system responsive to frequency variations of a source and comprising a four arm differential bridge having two sets of input terminals and a zero mutual transfer impedance between the sets of input terminals, a relay having an operating coil forming one arm of said bridge and a movable contact adapted to engage one or the other of a pair of stationary contacts, a first saturable core transformer having a primary winding energized by said source and a secondary winding connected to the input junctions of a first rectifier bridge, leads connecting the output junctions of the said first rectifier bridge to one set of input terminals of the differential bridge, a second saturable core transformer having a primary winding energized by a constant frequency source and a secondary winding connected to the input junctions of a second rectifier bridge, and leads connecting the output junctions of the second rectifier bridge to the second set of input terminals of the differential bridge.

An object of this invention is to provide apparatus for controlling the speed of a rotating member comprising a four-arm differential bridge including two sets of input terminals and having a zero mutual transfer impedance between said sets of input terminals, means for developing a voltage at a frequency proportional to the speed of the rotating member, means impressing such voltage across one set of input terminals, means connecting a sensitive relay comprising an operating coil and a contact movable thereby between fixed control contacts as one arm of said bridge, means operated upon closure of said control contacts to adjust the motor field rheostat, whereby the speed thereof is controlled, and means connecting a reference source of voltage to the other set of input terminals.

An object of the invention is the provision of a speed indicating and control arrangement for a rotating member comprising an indicating instrument responsive to the output of a tachometer generator coupled to the rotating member, an electrical network including a symmetrically balanced bridge connected to said generator and a reference source of current, and a sensitive relay connected as one arm of said bridge to control the adjustment of the motor field rheostat.

An object of the invention is to provide apparatus for controlling the speed of electrical motors which apparatus can readily be adjusted by the operator to a selected motor speed and to a desired span of speed control, and which apparatus will react to a change of less than 1% in the selected speed.

These and other objects and advantages will become apparent from the following detailed description when taken with the accompanying drawing illustrating an embodiment of the invention. It will be understood that the drawing is for purposes of illustration and does not define the scope or limits of the invention, reference being had for the latter purpose to the appended claims.

Referring now to the drawing in detail, the reference character 11 designates the tachometer generator, driven by a D.-C. motor 52, the speed of which is to be controlled. The voltage output of the generator on the one hand, energizes an electrical speed indicating instrument 12 of the movable coil type, said instrument having a scale calibrated in actual motor speeds. On the other hand, there is provided a reference source of voltage represented by the plug 13. The generator 11 and the reference source of voltage are connected through a network that includes a symmetrically balanced bridge 14.

The movable coil 15 of a sensitive relay 16 forms one arm of the bridge 14, in combination with series control adjustable resistor 17 and shunt control adjustable resistor 18. The other arms of the bridge comprise resistors 19, 21 and 22. The optimum bridge relationship obtains when the three bridge resistors 19, 21 and 22 are each equal to the effective resistance of the movable coil 15 and its connected resistors 17 and 18.

Where the generator 11 is one of a direct current type, the reference source of voltage 13 is also direct current and the output of the generator and the reference source are impressed across opposed bridge terminals 29, 31 and 42, 43 in the manner indicated, the connection from the generator being through the movable coil 30 of the speed indicator 12.

However, in the embodiment illustrated, it is assumed that the generator 11 is of the alternating current type. The connection is, therefore, such that alternating current is transformed to unidirectional current for the illustrated network. Specifically, the output of the generator 11 is connected to the primary winding 23 of a saturable-core transformer 24, or one which provides for a substantially linear relationship between the output current and input frequency. The secondary winding 25 of the transformer 24 is connected to the input terminals of a preferably full-wave rectifier bridge 26, through an adjustable resistor 27. This resistor 27 provides for setting the maximum operating point of the system, which point corresponds to the top mark on the indicator 12. The unidirectional output of bridge 26, desirably smoothed out by a condenser 28, is then connected through speed indicator 12 to input terminals 29 and 31 of the bridge 14.

Similarly, the reference source of voltage 13, in this case assumed to be alternating current, is connected to the primary winding 32 of a step-down transformer 33 so that the voltage developed in the secondary winding 34 is of relatively low magnitude but sufficient to saturate the core of the transformer 36. The secondary winding 34 is, in turn, connected to the primary winding 35 of the saturable-core transformer 36, or one like the transformer 24 providing for a substantially linear relationship between output current and input frequency. The secondary winding 37 of the transformer 36 is connected through a current-adjusting, variable resistor 38 to the input terminals of the desirably full wave rectifier bridge 39 and the unidirectional output of the bridge 39, desirably smoothed out by condenser 41, is impressed across the terminals 42 and 43 of the differential bridge 14, such terminals being opposed to terminals 29 and 31 to which the generator 11 is connected.

Those skilled in the art will understand that the transformer 33 is required only for voltage-magnitude transformation and the rectifier bridges 26 and 39 may have rectifier elements in all four arms.

The system is prepared for operation as follows: Assume that the indicating instrument has a scale calibrated 0–10,000 R. P. M. and that the pointer will be at midscale (5,000 R. P. M.) when 5 milliamperes flow through the indicator coil 30. The overall range of the system is, therefore, 0–10,000 R. P. M. and the control point of the system can be set at any desired point within such range. It will be assumed that it is desired to maintain the speed of the motor at 5,000 R. P. M. Since the operating coil of the indicator 12 is connected between one output junction of the rectifier bridge 26 and the input terminal 31 of the differential bridge it is apparent that a current of 5 milliamperes will flow in the differential bridge through the one set of input terminals 29, 31 when the motor speed, as indicated by the instrument 12, is 5,000 R. P. M. This, of course, assumes that the gearing, if any, coupling the tachometer generator 11 to the motor 52 and the output characteristics of the tachometer generator are such that a current of 5 milliamperes will flow through the indicator when the motor speed actually is 5,000 R. P. M. The resistor 38 is now adjusted so that 5 milliamperes flow in the differential bridge through the bridge input terminals 42, 43, such current being equal in magnitude but of opposite polarity to the current flowing through the bridge input terminals 29, 31. Under such conditions the differential bridge is balanced and no current flows through the operating coil 15 of the sensitive relay 16.

The sensitive relay 16, in the differential bridge 14, may be of the zero center type with 5 microamperes sensitivity, and provided with a solenoid reset coil 40. As an example of the type of solenoid reset apparatus which may be employed, see R. T. Pierce Patent No. 2,515,314, dated July 18, 1950. Specifically, however, the solenoid reset apparatus is actuated upon operation of one or the other power relays generally designated by the numerals 50 and 51, as will be described in more detail hereinbelow.

The combination of the relay coil 15 and the series and shunt resistors, 17 and 18, respectively, forms one arm of the differential bridge 14. Since the currents flowing through the two input circuits of the differential bridge are equal and opposite, no current will flow through the relay coil 15 at the set speed of 5,000 R. P. M. However, if and as the motor speed changes, the current flowing into the bridge at terminal 29 changes accordingly. This results in an unbalance of the bridge and a flow of current through the sensitive relay coil 15 causing the movable contact arm 44 to move toward one or the other of the stationary contacts 45, 46. The change in speed necessary to cause a closure of the relay contacts will depend on the value of the resistors 17 and 18 which have been inserted in the bridge to provide for changing the relay sensitivity.

The pointer or movable contact 44, of the sensitive relay 16, moves between fixed contacts 45 and 46 which preferably are permanent magnets. These contacts are connected, respectively, to leads 47, 48 and 49 to control the actuation of the power relays 50 and 51, such actuation of either power relay energizing the reset coil 40 and effectuating a change in the speed of the motor. The exact way in which these functions are accomplished will now be described.

The power relays 50 and 51 are identical, so that only one need be fully described. It is here pointed out, however, that the relay 50 acts when the tachometer generator speed (and therefor its output frequency) is above normal a predetermined amount, whereas the other relay 51 acts when the generator speed is below normal a predetermined amount, to appropriately adjust the speed of the motor 52 that is mechanically coupled to the generator. When the speed of generator 11 increases, the current applied to the coil 15 of the sensitive relay 16 increases, resulting in a movement of the pointer or movable contact 44 into engagement with the right stationary contact 46. This contact 46 is connected to one side of operating coil 54 of the power relay 50 by the lead 49. The relay coil 54 is thus energized, withdrawing its armatures or movable contacts 55 and 56 from their back contacts 57 and 58, toward which they are spring biased, to energized positions where they engage their front contacts 59 and 60, respectively. The circuit for effecting this operation is from one side of a source of voltage 61, here indicated as 115 volts AC, through lead 47, pointer 44, contact 46, lead 49, coil 54 and leads 53 and 62, back to the other side of the source of voltage 61. The closing of the power relay contacts 56 and 60 energizes one coil 64 of reversible positioning motor 65, the circuit being traceable as follows: voltage source 66, lead 67, now-closed relay contacts 56 and 60, lead 63, coil 64 and lead 63'. Such energization of the motor coil 64 turns the rheostat or adjustable resistor 68, through mechanical connection 70, to decrease the resistance connected between the motor field 72 and the energizing source 71. This results in an incremental decrease in the speed of the motor.

The actuation of the power relay 50 also results in the energization of the solenoid reset coil 40 associated with the sensitive relay 16, the circuit being traceable as follows: the voltage source 61, lead 47, reset coil 40, leads 73 and 74, now-closed power relay contacts 55 and 59 and lead 75. This energization of the reset coil 40 resets the pointer 44, by pulling it back to a center position, thereby breaking engagement with the contact 46, and opening the circuit previously formed by such engagement. This opening of the circuit disconnects the power relay coil 54 from the source of power 61, the energy stored therein being dissipated through arc suppressor resistor 76, thereby protecting the sensitive relay contacts.

It will now be apparent that when the speed of the motor 52 increases above normal the increased frequency output of the tachometer generator caused a closure of the sensitive relay contacts 44, 46 thereby completing a circuit to energize the operating coil of the power relay 50. Actuation of the power relay results in a closure of its dual set of contacts, one set of contacts energizing the appropriate coil of the positioning motor 65 to bring about a reduction in the speed of the motor 52, and the other set of contacts effectuating a resetting of the sensitive relay contacts through the reset coil 40. As soon as the sensitive relay contacts are reset, the power relay is de-energized and its movable contacts drop back to normal position whereby both the coil of the positioning motor and the reset coil of the sensitive relay are de-energized. Upon de-energization of the reset coil the movable contact arm 44, of the sensitive relay is again free to move in accordance with the frequency generated by the tachometer generator. If the incremental change, in the speed of the motor 52, brought about by such momentary operation of the power relay, is sufficient to prevent a subsequent closure of the sensitive relay contacts the apparatus lies dormant. If, however, such change in the motor speed still lies above the normal value, the sensitive relay contacts will again close immediately upon the de-energization of the reset coil whereby the entire pulse-type operation is repeated to bring about a still further incremental change in the motor speed.

If, however, the speed of the motor 52 and the generator 11 decrease a predetermined amount below that for which the apparatus is set, the movable contact 44 of the sensitive relay engages the left stationary contact 45 to effect in a similar way, but through power relay 51, an energization of the other coil 77 of the positioning motor 65. The energization of the coil 77 effects reverse operation of the positioning motor 65 (through a phase displacement brought about by the condenser 78) to thereby increase the amount of the resistance in circuit with the field coil of the motor 52. This operation correspondingly increases the speed of the motor 52. At the same time, the solenoid reset coil 40 is energized to restore the pointer 44 to its center position and break the circuit energized upon said pointer engaging contact 45, thereby de-energizing the positioning motor 65 and preventing any further increase in the speed of the motor 52. If, however, the speed of the motor is still sufficiently below that called for by the setting of the apparatus, the pointer 44 will pulsatingly engage the contact 45 until the speed is adjusted to a value which will not close the sensitive relay contacts.

From the foregoing description, the flexibility of the system becomes apparent. To set the apparatus at a desired operating point, the speed of the motor 52 is brought to a selected operating speed, say 5,000 R. P. M., as indicated on the calibrated speed indicator 12 and the reference current is adjusted by means of the potentiometer 38 until the movable arm of the sensitive relay 16 is aligned with the zero position, that is, midway between the stationary contacts 45, 46. The resistors 17 and 18 have associated therewith a suitably calibrated dial preferably marked in terms of percentage of the maximum operating point of the system as established by a setting of the resistor 27. Thus, the user can set the control point sensitivity by merely setting the adjustable arms of the resistors 17, 18 to a selected dial marking. For example, if such resistors are set to the ½ percent dial marking, the closure of the sensitive relay contacts will occur when the motor speed changes —50 R. P. M. from the set speed of 5,000 R. P. M. That is, the speed of the motor will be maintained between 4,950 and 5,050 R. P. M. Actually, the response of the system is such that it can be adjusted to react to a speed change of as little as ¼ of 1 percent of the maximum operating point of the system. The adjustment of the overall range of the apparatus, in terms of speed, is accomplished by an appropriate setting of the potentiometer 27 since this potentiometer fractionates the current developed in the secondary winding 25 of the saturable core transformer 24. Specifically, if the reference current applied to one set of bridge input terminals 42, 43, is, say 5 milliamperes, the sensitive relay will be at its zero center position when the current applied to the other bridge input terminals 29, 31 is equal to 5 milliamperes. This latter current depends upon the characteristics of the tachometer generator and the setting of the associated potentiometer 27. If it be assumed that the generator causes 6 milliamperes to flow at 5,000 R. P. M. the potentiometer can be adjusted so that 5 milliamperes flow in the bridge through the terminals 29, 31 when the generator is rotating at 5,000 R. P. M. If, now, the overall speed range of the apparatus is to be increased to, say 20,000 R. P. M., the potentiometer 27 is readjusted to maintain a flow of 5 milliamperes in the bridge circuit at the increased output of the generator. If, also, the calibrated speed scale of the indicator has a top mark of 10,000 R. P. M. such doubling of the range of the apparatus will require multiplying the indicator readings by a factor of 2 since such indicator is energized by the current output of the rectifier bridge 26 as is also the one side of the transfer bridge 14. In actual practice it is preferable to calibrate the scale of the indicator so that its top mark indication corresponds to the highest speed of the motor whereby all indicator readings may be taken directly from a single scale.

Having now described our invention in detail in accordance with the patent statutes, those skilled in the art will have no difficulty in making changes and modifications in the individual parts or their relative assembly in order to meet specific requirements or conditions. Such changes and modifications may be made without departing from the scope and spirit of the invention, as set forth in the following claims.

We claim:

1. An electrical system responsive to the frequency changes of a voltage source comprising a four arm differential bridge having two sets of input terminals and having a zero mutual transfer impedance between the sets of input terminals, a current-responsive device having an operating coil forming one arm of the differential bridge, means connecting the said voltage source across one of the said sets of input terminals, and a fixed frequency reference voltage having a predetermined magnitude connected across the other of said sets of input terminals.

2. An electrical system responsive to changes in a variable condition comprising voltage generating means producing a voltage the frequency of which varies with changes in the condition, a four arm bridge having two sets of input terminals and having a zero mutual transfer impedance between the sets of input terminals, a current-responsive device having an operating coil forming one arm of the differential bridge, means for impressing the voltage developed by the said voltage generating means across one of the said sets of input terminals, and a reference voltage source of fixed frequency and predetermined magnitude connected across the other of the said sets of input terminals.

3. An electrical system responsive to changes in a variable condition comprising a four arm differential bridge having two sets of input terminals and having a zero mutual transfer impedance between the sets of input terminals, a current responsive device having an operating coil forming one arm of the differential bridge, a tachometer generator producing an output voltage which varies in frequency and magnitude in accordance with changes in the condition, a first saturable core transformer having a primary winding energized by the output voltage of the tachometer generator and a secondary winding, a first rectifier bridge having its input junctions connected to the said transformer secondary winding and its output junctions connected to a first of said sets of input terminals and a reference source of direct current of predetermined magnitude connected to the other of said sets of input terminals.

4. The invention as recited in claim 3, wherein the reference source of direct current comprises a second saturable core transformer having a primary winding energized by a voltage source of fixed frequency and a secondary winding, a second rectifier bridge having its input junctions connected to the secondary winding of the said second transformer through an adjustable resistor and its output junctions connected to the second of said set of input terminals.

5. The invention as recited in claim 4 including a pair of simultaneously-adjustable resistors one of which is connected in series with the said operating coil and the other of which is connected in parallel with said coil.

6. An electrical system responsive to the changes in the speed of a rotating member and comprising a tachometer generator mechanically coupled to the rotating member; a saturable core transformer having a primary winding energized by the output voltage of the generator and a secondary winding; a rectifier bridge having its input junctions connected to the said transformer secondary winding through an adjustable resistor; a sensitive relay having an operating coil and a movable contact movable into engagement with one or another of two stationary contacts; a four arm differential bridge having two sets of input terminals and having a zero mutual transfer impedance between said sets of input terminals, one arm of said bridge being constituted by the said operating coil of the relay; leads connecting the output junctions of the said rectifier bridge to a first of said set of input terminals; a direct current indicating instrument having a scale calibrated in speed values and an operating coil connected between the output junctions of the said rectifier bridge and the first of said set of input terminals; and a reference voltage of predetermined magnitude impressed across the second of said set of input terminals.

7. Apparatus responsive to speed variations of a rotating member from a preselected speed value said apparatus comprising a tachometer generator mechanically coupled to the rotating member; a sensitive relay having an operating coil and a movable contact movable into engagement with one or the other of two stationary contacts; a four arm differential bridge having two sets of input terminals and a zero mutual transfer impedance between the sets of input terminals, one arm of said bridge being the said operating coil; means applying the generator output voltage across one set of input terminals of the differential bridge; a reference voltage of predetermined magnitude impressed across the other set of input terminals of the differential bridge; means to adjust the voltage across the said one set of input terminals of the differential bridge to the magnitude of the said reference voltage when the rotating member is rotating at the preselected speed value; and control means effective upon closure of a pair of relay contacts to alter the speed of the member in a sense and magnitude to maintain a voltage balance between the two voltages applied to the input terminals of the differential bridge.

8. The invention as recited in claim 7 including an indicator having a scale calibrated in speed values, said indicator being connected in the circuit between the generator and the said one set of input terminals of the differential bridge.

9. The invention as recited in claim 8 wherein the sensitive relay is of the magnetic contact type and including means resetting the relay contacts upon actuation of said control means.

10. The invention as recited in claim 7 including a first adjustable resistor connected in series with the said operating coil of the relay, and a second adjustable resistor connected across such operating coil.

11. Apparatus for maintaining the speed of a rotating member at a preselected speed value comprising a tachometer generator mechanically coupled to the member; a saturable core transformer having a primary winding energized by the voltage developed by the generator and a secondary winding; a rectifier bridge having input junctions connected to the said secondary winding; a sensitive relay having an operating coil and a movable contact adapted to engage one or the other of two stationary contacts; a four-arm differential bridge, one arm of which is constituted by the relay operating coil, said bridge having a zero mutual transfer impedance across two sets of bridge input terminals; an indicator having an operating coil and a scale calibrated in speed values; circuit elements connecting the output terminals of the rectifier bridge to one set of input terminals of the differential bridge through the operating coil of said indicator; a source of reference voltage; circuit elements impressing the reference voltage across the other set of input terminals of the differential bridge; means to adjust the magnitude of the voltage applied to the said one set of input terminals of the differential bridge to equal that of the reference voltage when the member is rotating at the preselected speed value; and control means actuated upon closure of the relay contacts to alter the speed of the member in a sense and magnitude to maintain a voltage balance between the two voltages applied to the input terminals of the differential bridge.

12. The invention as recited in claim 11 including a first adjustable resistor connected in series with the relay operating coil and a second adjustable resistor connected in parallel with such operating coil.

13. Apparatus for maintaining the speed of an electric motor at a preselected value said apparatus comprising a tachometer generator mechanically coupled to the motor; a first saturable core transformer having a primary winding connected to the output terminals of the generator and a secondary winding; a first rectifier bridge having its input junctions connected to the said secondary winding; a sensitive relay having an operating coil and a movable contact adapted to engage with one or the other of two stationary contacts; a four-arm differential bridge, one arm of which is constituted by the said relay operating coil, said bridge having a zero mutual transfer impedance across its two sets of input terminals; an indicator having an operating coil and a pointer movable over a scale calibrated in speed values; circuit elements connecting the output junctions of said first rectifier bridge through the operating coil of the indicator to one set of input terminals of the differential bridge; a source of reference voltage; a second saturable core transformer having a primary winding connected to the reference voltage source and a secondary winding; a second rectifier bridge having its input junctions connected to the secondary winding of the said second transformer; circuit elements connecting the output junctions of the second rectifier bridge to the other set of input terminals of the differential bridge; a pair of power relays each having an operating coil and a set of normally-open contacts; circuit elements including a source of voltage effectuating energization of one or the other of the power relay operating coils upon engagement of the movable contact of the sensitive relay with one or the other of the associated stationary contacts; control means effective upon actuation of a power relay to alter the speed of the motor in a sense to maintain a voltage balance between the two voltages applied to the input terminals of the differential bridge.

14. The invention as recited in claim 13 wherein the motor is energized from a direct current source and includes a rheostat in the field winding, and the said control means comprises a reversible positioning motor having an armature coupled to the movable arm of said rheostat and a pair of operating windings, means effective upon closure of the contacts of one power relay to energize one of said operating windings to move the rheostat arm in one direction, and means effective upon closure of the contacts of the other power relay to energize the other said operating winding to move the rheostat arm in the reverse direction.

15. The invention as recited in claim 14 wherein the contacts of the sensitive relay are of the magnetic type, and including means effective upon actuation of either power relay to reset the sensitive relay contacts.

References Cited in the file of this patent

UNITED STATES PATENTS

| 1,751,225 | Ashbaugh | Mar. 18, 1930 |
| 1,774,673 | Schleicher et al. | Sept. 2, 1930 |